United States Patent
Maley

(10) Patent No.: US 9,434,275 B2
(45) Date of Patent: Sep. 6, 2016

(54) VEHICLE REAR SEAT REMINDER SYSTEMS AND METHODS

(71) Applicant: Toyota Motor Engineering & Manufacturing North America, Inc., Erlanger, KY (US)

(72) Inventor: Robin M. Maley, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 134 days.

(21) Appl. No.: 14/108,984

(22) Filed: Dec. 17, 2013

(65) Prior Publication Data

US 2015/0165932 A1   Jun. 18, 2015

(51) Int. Cl.
*B60N 2/00* (2006.01)
*B60N 2/26* (2006.01)
*G08B 21/24* (2006.01)

(52) U.S. Cl.
CPC ............. *B60N 2/002* (2013.01); *B60N 2/26* (2013.01); *G08B 21/24* (2013.01)

(58) Field of Classification Search
CPC ...... B60N 2/002; B60N 2/26; B60N 2/2812; B60N 2002/2815; G08B 21/22; G08B 21/24; G08B 21/0247; G08B 21/0469; E05B 77/26; E05B 77/54; E05B 81/00; E05B 81/04; E05B 81/06; E05B 81/14; E05B 81/54; E05B 81/82; E05B 81/86; E05B 83/36; A44B 11/2503; A61G 2003/067; A61G 3/061; A61G 3/0808; B60J 1/08; B60Q 1/00; B60R 21/01534; B60R 21/01536; B60R 21/01556; B60R 22/105

USPC ............ 340/457, 457.1, 573.1, 572.1, 425.5, 340/426.1, 438, 439, 460, 521, 665, 666, 340/667; 297/217.3, 250.1
See application file for complete search history.

(56) References Cited

U.S. PATENT DOCUMENTS

| | | | |
|---|---|---|---|
| 7,321,306 B2 * | 1/2008 | Lee et al. | 340/572.1 |
| 7,786,852 B2 * | 8/2010 | Kautz | 340/457 |
| 8,038,213 B2 * | 10/2011 | Owens | 297/250.1 |
| 8,063,788 B1 | 11/2011 | Morningstar | |
| 8,232,874 B1 | 7/2012 | Aneiros et al. | |
| 2003/0042793 A1 * | 3/2003 | Li | 307/10.1 |
| 2004/0239183 A1 * | 12/2004 | Delgado et al. | 307/10.1 |
| 2006/0044124 A1 * | 3/2006 | Hofbeck et al. | 340/438 |
| 2007/0075575 A1 * | 4/2007 | Gregory et al. | 297/217.3 |

(Continued)

FOREIGN PATENT DOCUMENTS

WO   WO2006113734   10/2006
WO   WO2011014554   2/2011

OTHER PUBLICATIONS

NASA Develops Child Seat Safety Device, www.spaceref.com/news/viewpr.html?pid=7316, publ. Feb. 5, 2002.

*Primary Examiner* — Fekadeselassie Girma
(74) *Attorney, Agent, or Firm* — Dinsmore & Shohl LLP

(57) ABSTRACT

A method of providing a vehicle rear seat reminder using a vehicle rear seat reminder system is provided. The method includes exposing a user input device of the vehicle rear seat reminder system by opening a door of a vehicle. The user input device is accessible to a user with the door in an open condition. The user input device being inaccessible to the user with the door in a closed condition. The user input device is actuated with the door in the open condition thereby initiating an alert program.

20 Claims, 6 Drawing Sheets

(56) References Cited

U.S. PATENT DOCUMENTS

| | | |
|---|---|---|
| 2007/0204442 A1* | 9/2007 | Falb et al. .................... 24/633 |
| 2009/0027188 A1* | 1/2009 | Saban ........................ 340/521 |
| 2009/0039658 A1* | 2/2009 | Spurr ....................... 292/336.3 |
| 2009/0146813 A1* | 6/2009 | Nuno ....................... 340/572.1 |
| 2009/0274542 A1* | 11/2009 | Pocobello et al. ............ 414/522 |
| 2010/0052337 A1* | 3/2010 | Arabia, Jr. .............. E05B 81/82 292/216 |
| 2011/0102169 A1* | 5/2011 | Orbach ........................ 340/457 |
| 2013/0049946 A1* | 2/2013 | Chavez ........................ 340/457 |
| 2014/0052342 A1* | 2/2014 | Seibert ........................... 701/45 |
| 2014/0195109 A1* | 7/2014 | Lange .................... E05B 77/54 701/36 |

\* cited by examiner

VEHICLE REAR SEAT REMINDER SYSTEMS AND METHODS

TECHNICAL FIELD

The present specification generally relates to vehicle reminder systems and, more particularly, to vehicle rear seat reminder systems and methods for reminding a driver or other occupant to check the rear seat of the vehicle.

BACKGROUND

There are a number of vehicle-related non-traffic incidents that can pose health and safety issues for children. One such incident is leaving a child unattended in a vehicle, particularly during hot or cold days. Some states have laws addressing this issue and others do not.

One approach has been proposed where an alert is activated when a child seat is buckled and when a car key is removed from the ignition. Another approach utilizes weight sensors to detect the presence of a child. Other approaches for providing a reminder that a child or other object is located in the rear seat are desired.

SUMMARY

In one embodiment, a method of providing a vehicle rear seat reminder using a vehicle rear seat reminder system is provided. The method includes exposing a user input device of the vehicle rear seat reminder system by opening a door of a vehicle. The user input device is accessible to a user with the door in an open condition. The user input device being inaccessible to the user with the door in a closed condition. The user input device is actuated with the door in the open condition thereby initiating an alert program.

In another embodiment, a method of providing a vehicle rear seat reminder system for a vehicle is provided. The method includes providing a user input device at a location on the vehicle such that the user input device is concealed with a rear door of the vehicle in a closed condition and is exposed with the rear door of the vehicle in an open condition. A signal is provided to a controller of the vehicle when the user input device is actuated with the rear door in the open condition.

In another embodiment, in a vehicle, a vehicle rear seat reminder system includes a controller and an engine sensor operably connected to the controller to provide engine information to the controller for detecting an engine OFF event. A front door sensor is operably connected to the controller to provide a signal to the controller upon a front door close event. A user input device is operably connected to the controller to provide a signal to the controller upon actuation of the user input device to initiate an alert program. The user input device is concealed between a rear door of the vehicle and a body component of the vehicle with the rear door in a closed condition.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to vehicle rear seat reminder systems and methods for reminding a driver or other occupant to check the rear seat of the vehicle. The vehicle seat reminder systems include an alert system including a controller and a user input. The user input is accessible to a user once a rear door of the vehicle is opened. Actuation of the user input can trigger an alert program used by the controller that looks for the opening of the rear door when alert conditions are met.

Figure 1:
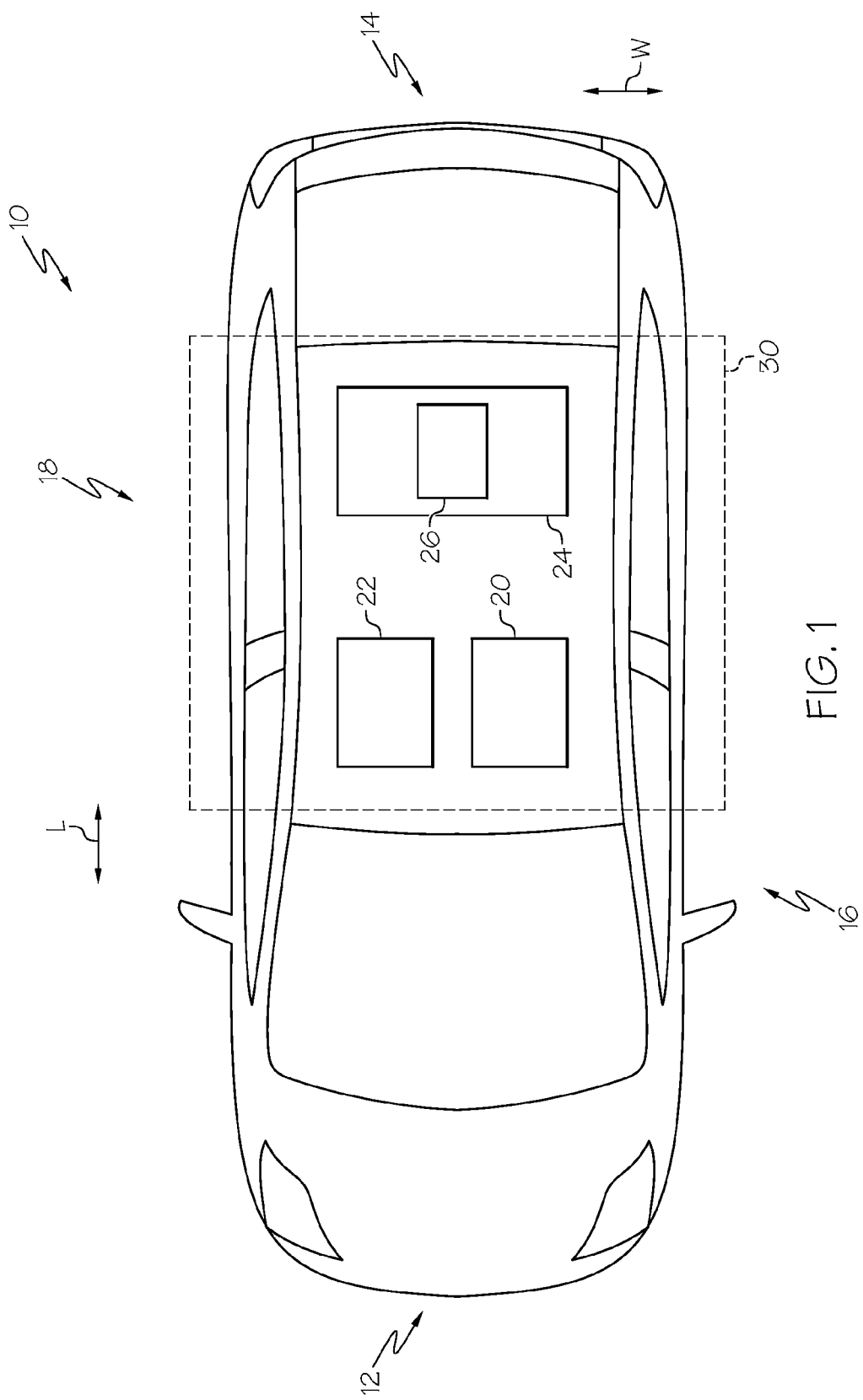
FIG. 1 is a top, diagrammatic view of a vehicle including a vehicle rear seat reminder system according to one or more embodiments described herein.

Referring to FIG. 1, a diagrammatic view of an embodiment of a motor vehicle 10 includes a front 12 and a rear 14 defining a general vehicle lengthwise direction L, a driver side 16 and a passenger side 18 defining a general vehicle widthwise direction W. The vehicle 10 includes a driver seat 20 at the driver side 16, a passenger seat 22 at the passenger side 18 and a rear seat 24 that extends from the driver side 16 to the passenger side 18 in the vehicle widthwise direction W at the rear 14 of the vehicle 10. In some embodiments, a child safety seat 26 may be securely positioned in the rear seat 24 using, for example, a safety belt. The child safety seat 26 may include a child belt with a buckle, such as a 5-point harness and may be front or rear facing.

A vehicle rear seat reminder system 30 is provided for reminding a driver or other occupant to check the rear seat 24 of the vehicle 10. In general, the vehicle rear seat reminder system 30 provides an indication to the driver or other occupant of the vehicle 10 if a child, important package or other item remains in the rear seat 24 under pre-selected alert conditions, which will be described in greater detail below. The vehicle rear seat reminder system 30 can be installed as original equipment by the manufacturer or added aftermarket.

Figure 2:
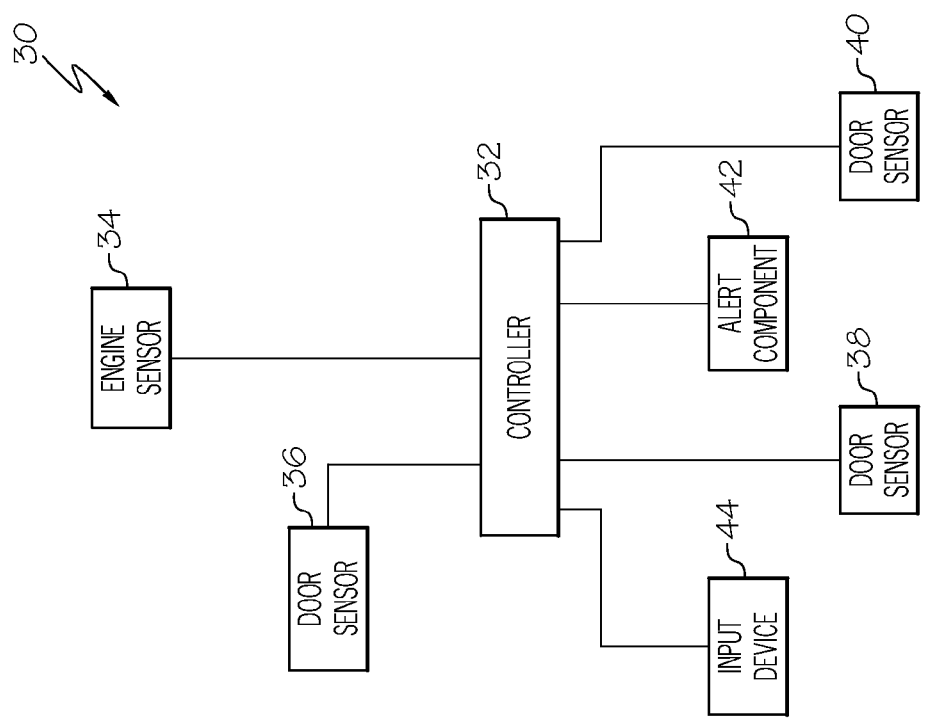
FIG. 2 is a diagrammatic illustration of the vehicle rear seat reminder system of FIG. 1.

Referring to FIG. 2, embodiments of the vehicle rear seat reminder system 30 may be part of the vehicle's Electronic Control Unit (ECU) and may utilize a controller 32, an engine sensor 34, a driver door sensor 36, one or more rear door sensors 38 and 40, an alert component 42 and a user input device 44. The driver door sensor 36 may be referred to herein as a front seat occupant detector and the rear door sensors 38 and 40 may be referred to as rear seat occupant detectors. One or more of the controller 32, engine sensor 34, driver door sensor 36, rear door sensors 38 and 40, alert component 42 and user input device 44 may be part of the original manufacture equipment for the vehicle or may be stand alone equipment. The controller 32 may execute a software program that is used to control operation of the vehicle rear seat reminder system 30. The controller 32 is operatively connected to the engine sensor 34, driver door sensor 36, rear door sensors 38 and 40 and user input device 44 to receive signals therefrom and for operation of the alert component 42.

The engine sensor 34 may be any suitable sensor that can detect or be used to detect engine status (ON/OFF). As examples, any one or more of oil pressure, fuel pressure, crankshaft position, camshaft position, spark plug operation, and battery voltage and their associated sensors may be used to detect operation or lack thereof of the engine. The door sensors 36, 38 and 40 may be any suitable sensor that can detect whether a door is in an open or closed, such as buttons, switches, reed sensors, proximity sensors, optical sensors, etc. The user input device 44 can be any device that allows a user to provide an indication to the controller 32 that triggers the alert program. For example, any one or more of buttons and switches may be provided by the user input device 44. The alert component 42 may be any suitable device capable of providing an audible and/or visual indication to the user providing a reminder or an alert that a child or object is located in the rear seat 24 of the vehicle 10. In some embodiments, the alert component 42 may be components of the vehicle 10, such as vehicle headlights, tail lights, horn, interior lighting, emergency lighting, etc. In other embodiments, a separate alert component 42 may be provided having lights, sound devices, etc.

Figure 3:
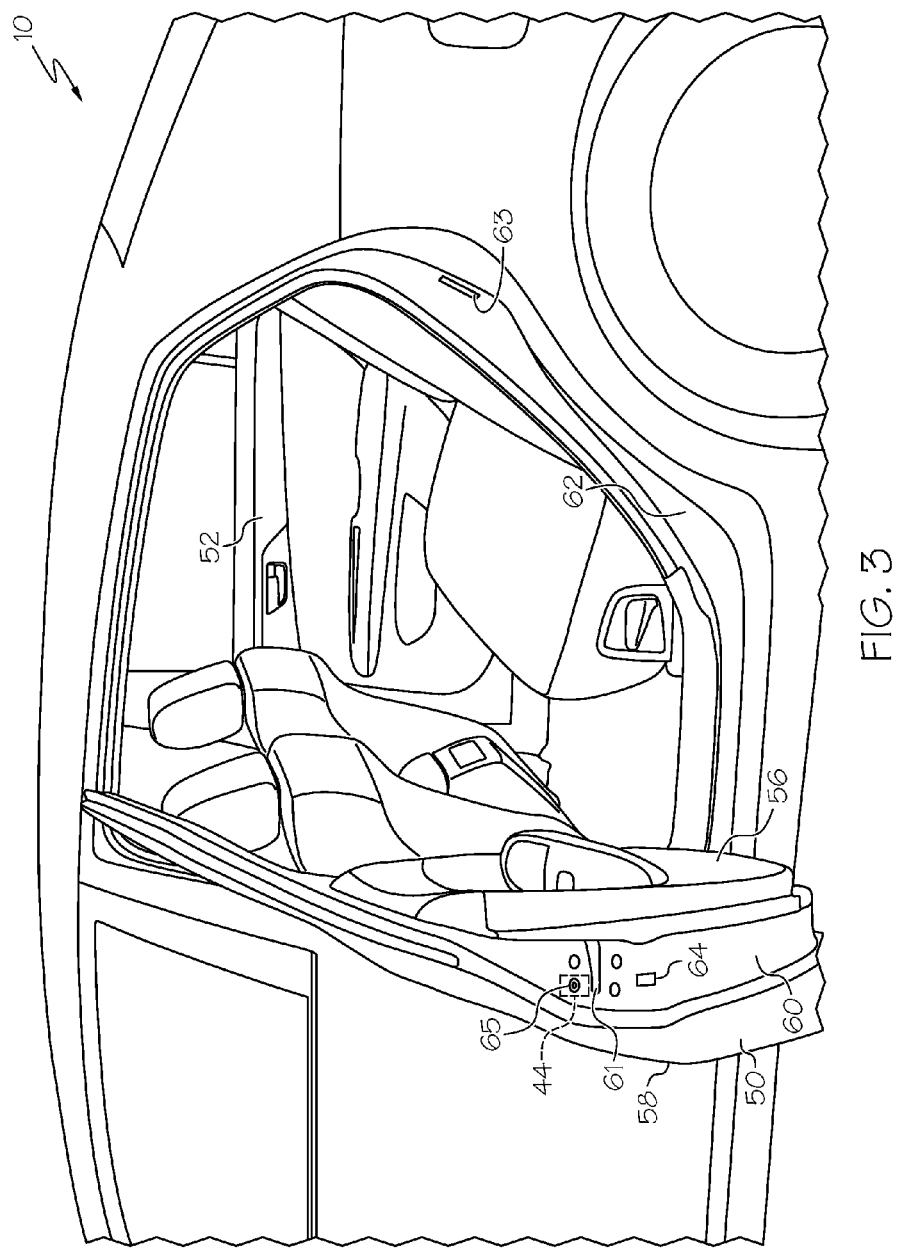
FIG. 3 is a side view of a vehicle showing a user input device of the vehicle rear seat reminder system of FIG. 2 with a rear door in an open condition according to one or more embodiments described herein.

Referring now to FIG. 3, the user input device 44 is located at one or both of a driver side rear door 50 and a passenger side rear door 52 (FIG. 1). The user input device 44 may be located on the rear door 50, 52, such that the user input device 44 is exposed and accessible to the user from outside the vehicle 10 when the rear door 50, 52 is in the open condition. As one example, illustrated by FIG. 3, the rear door 50 includes an interior panel 56 and an exterior panel 58. Located between the interior panel 56 and the exterior panel 58 is a shut face panel 60 that carries a door latch assembly 61 that latches to a striker 63 of vehicle body 62 (FIG. 1) to latch the rear door 50 in the closed configuration. In some embodiments, the shut face panel 60 may also carry a child safety lock device control 64 that can be used to prevent the rear door 50 from opening from inside the vehicle 10.

The user input device 44 is located at the shut face panel 60 of the rear door 50. In the illustrated embodiment, the user input device 44 includes a button 65 that may be located at any suitable position on the shut face panel 60, such as above, below or between the door latch assembly 61 and child safety lock device control 64. The button of the user input device 44 may be any suitable color, such as red, white, etc., and may be illuminated to highlight location, particularly in low light conditions. Further, indicia may be provided that indicates that the user input device 44 is used to initiate the alert program.

Figure 4:
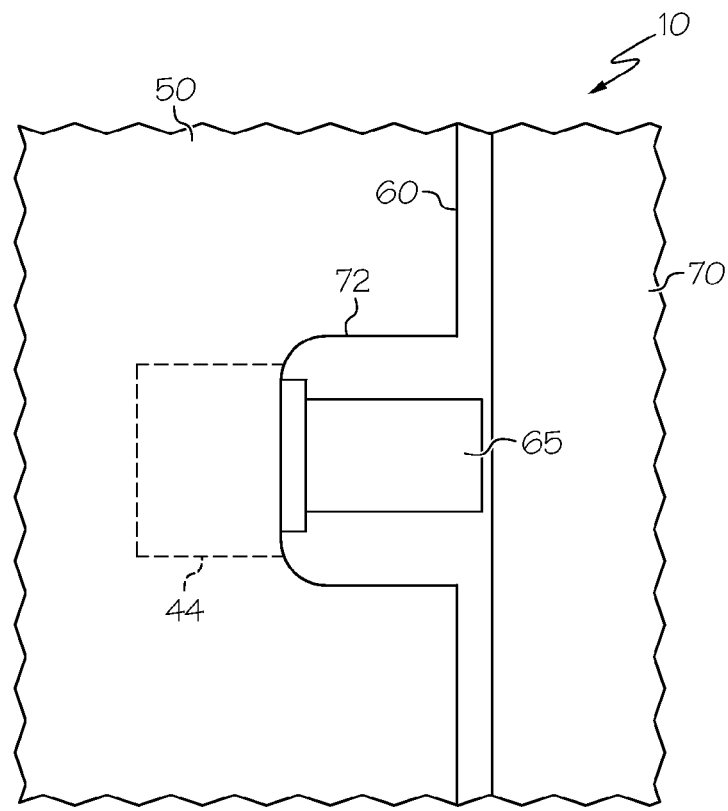
FIG. 4 illustrates the user input device with the rear door in a closed condition according to one or more embodiments described herein.

FIG. 3 illustrates the rear door 50 in the open configuration. Referring to FIG. 4, with the rear door 50 in the closed configuration, the user input device 44 is not accessible from outside or inside the vehicle 10. As can be seen, the user input device 44 may be located within a space formed between the shut face panel 60 and a body component 70 (e.g., a C-pillar) of the vehicle 10. In particular, the shut face panel 60 may have a recessed portion 72 in which the button 65 of the user input device 44 extends that provides spacing between the shut face panel 60 and the body component 70. Thus, the user input device 44 is accessible to the user from outside the vehicle 10 with the rear door 50 in the open configuration and is not accessible to the user from outside (or inside) the vehicle 10 with the rear door 50 in the closed configuration. Of course, while rear door 50 is discussed primarily above, the user input device may also be located on rear door 52 on the passenger side 18 in the same fashion.

Figure 5:
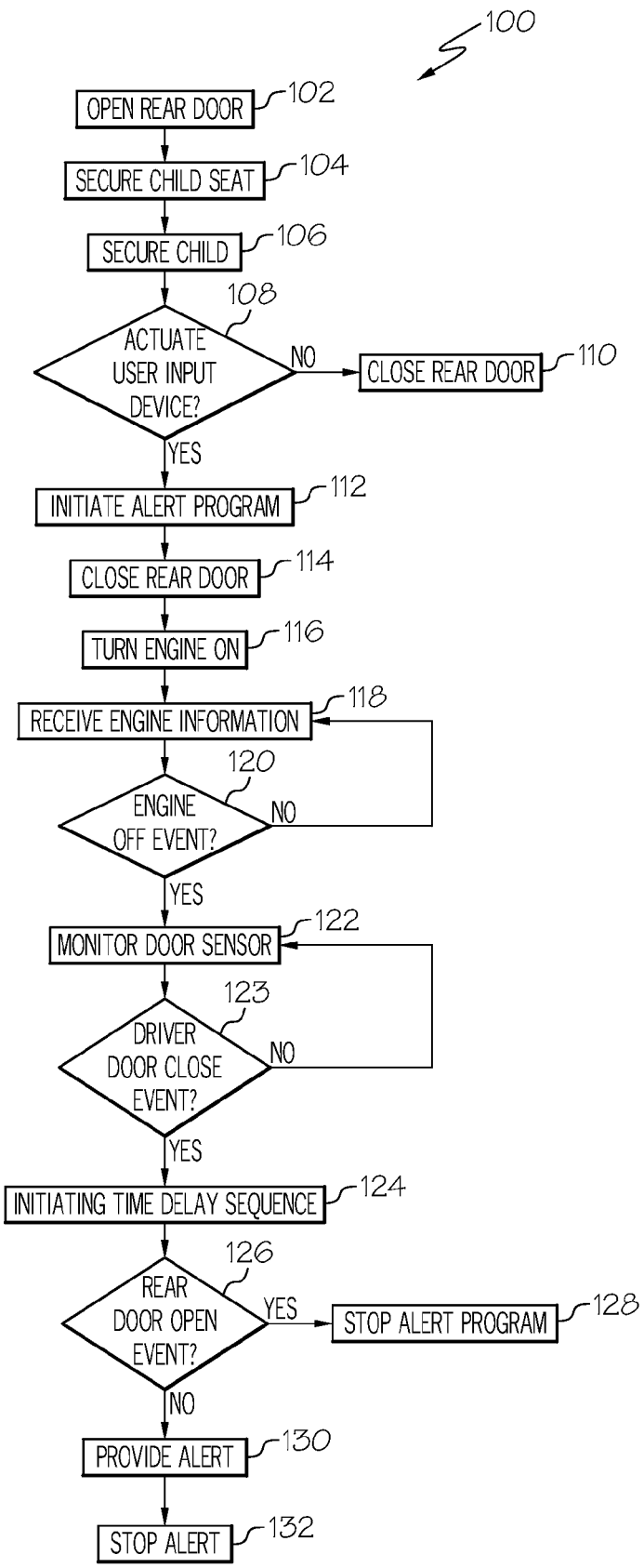
FIG. 5 illustrates a method of providing a rear seat reminder using the vehicle rear seat reminder system of FIG. 2 according to one or more embodiments described herein.

Referring to FIG. 5, a method 100 of providing a rear seat reminder is shown. The method may be implemented in the vehicle rear seat reminder system 30 using software, hardware and/or firmware and executed by the controller 32. At step 102, a user opens the rear door 50, 52 thereby exposing the user input device 44. As discussed above, the user input device 44 may be exposed at the shut face panel 60 of the rear door 50, 52 as the door is being rotated to the open configuration. In some embodiments, a step of illuminating the user input device 44 may be provided. The illumination may serve as a reminder to actuate the user input device. For example, blinking lights and/or sounds may be provided. At step 104, a child seat may be secured within the vehicle 10 in accordance with manufacturer instructions, for example, using a seat belt. A child may then be secured within the child seat in accordance with manufacturer instructions at step 106.

At step 108, the user decides whether or not to actuate the user input device 44. If the user decides not to actuate the user input device 44, the user may close the rear door 50, 52 at step 110. For example, an unimportant package or object not to be removed from the vehicle 10 may be placed in the rear seat 24, instead of a child. At step 112, if the user decides to actuate the user input device 44, the alert program is initiated. The alert program utilizes an engine OFF, driver door closed, time delay and rear door open events to determine whether a reminder alert should be provided. The user may close the rear door 50, 52 at step 114.

The user can then open a front door, sit in the driver seat 20 and turn the engine ON using the ignition at step 116. At step 118, the controller 32 receives engine information from the engine sensor 34 that can be used by the controller 32 for determining an engine OFF event. The engine sensor 34 may provide engine information such as any one or more of oil pressure, fuel pressure, crankshaft position, camshaft position, spark plug operation, and battery voltage for determining an engine OFF event; however, this list is not exhaustive.

At step 120, the controller 32 uses the engine information to determine whether an engine OFF event has occurred. If no engine OFF event is detected by the controller 32, the controller 32 continues to monitor the engine information. If an engine OFF event is detected by the controller 32 using the engine information, the controller 32 looks for a driver door close event by monitoring the driver door sensor 36 at step 122. At step 123, the controller 32 uses a signal from the driver door sensor 36 to detect the driver door close event. If no driver close door event is detected by the controller 32, the controller 32 continues to monitor the driver door sensor 36. If a driver door close event is detected by the controller 32, a time delay sequence is initiated by the controller 32 at step 124. The time delay sequence may include a time delay of a preselected period of time (e.g., between about 5 seconds and about 1 minute, such as about 10 seconds) before providing a reminder alert if the rear door 50, 52 is not opened. At step 126, the controller 32 looks for a rear door 50, 52 open event using the rear door sensor 38, 40 during the time delay sequence. If a rear door open event is detected by the controller 32, the controller 32 stops the alert program at step 128. If a rear door open event is not detected by the controller 32, the controller 32 instructs the alert component 42 to provide an alert, which may be an audible and/or visual alert at step 130. For example, the alert component 42 may include a vehicle horn and/or lights. The alert may continue until a preselected event occurs such as the rear door 50, 52 is opened, a front door is opened or for a preselected period of time. At step 132, the controller 32 instructs the alert component 42 to halt the alert.

Figure 6:
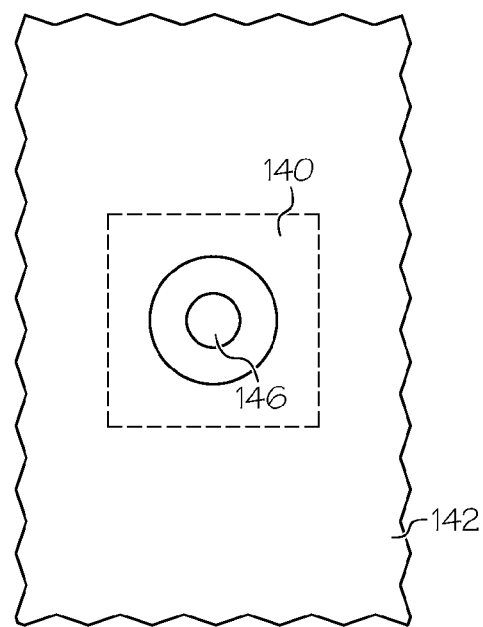
FIG. 6 illustrates another embodiment of a user input device according to one or more embodiments described herein.

Referring to FIG. 6, while the above user input device 44 is connected to the shut face panel 60 of the rear door 50, 52, the user input device 44 may be located elsewhere. For example, a user input device 140 is illustrated located on a door frame 142 of the vehicle 10. The user input device 140 is located on the door frame 142 (e.g., at the C-pillar or B-pillar), such that a button 165 of the user input device 140 is exposed and accessible to the user from outside the vehicle 10 when the rear door 50, 52 is in the open condition and not accessible when the rear door 50, 52 is in the closed condition.

Figure 7:
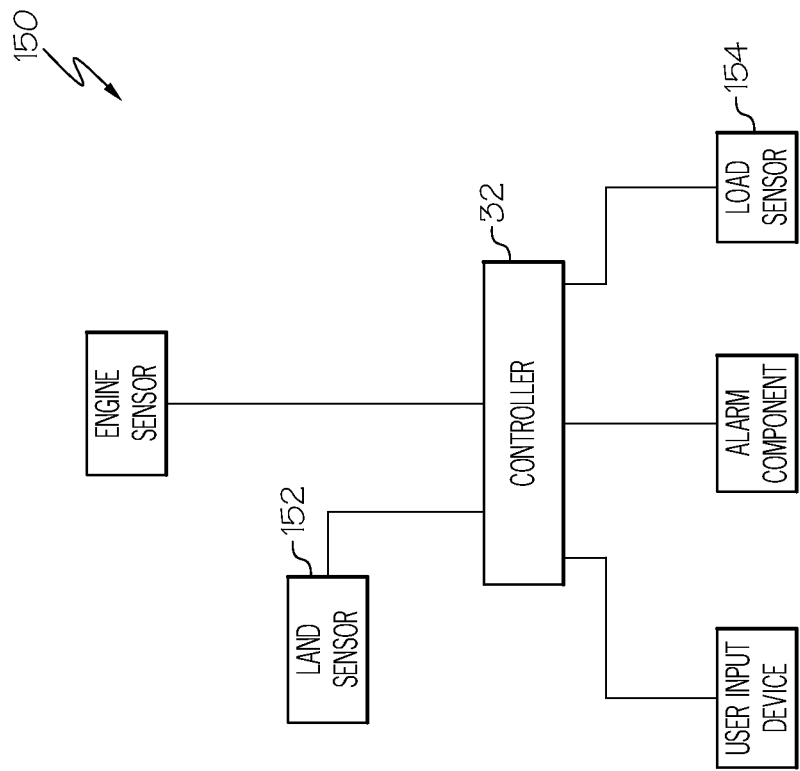
FIG. 7 illustrates another embodiment of a vehicle rear seat reminder system according to one or more embodiments described herein.

Referring to FIG. 7, another embodiment of a vehicle rear seat reminder system 150 is illustrated. In this embodiment, other front and rear seat occupant detectors may be used. In the illustrated embodiment, as an example, a load sensor 152 may be used in the vehicle rear seat reminder system 150 to detect when a driver is removed from the front seat 20. In the method of providing a rear seat reminder, the controller 32 may receive an indication from the load sensor 152 in addition to or instead of detecting a driver door closed event. Another load sensor 154 may be provided in the vehicle rear seat reminder system 150 to detect when a child is removed from the rear seat 24. In the method of providing a rear seat reminder, the controller 32 may receive an indication from the load sensor 154 and instruct the alert component 42 to halt the alert, for example, in addition to or instead of detecting a rear door open event.

The above-described vehicle rear seat reminder systems allow for manual setting or initiation of an alert program that can be used to remind a driver or other vehicle occupant that a child, pet or item, such as an important package, perishable item, etc., remains in the rear seat under predetermined alert conditions. The user can manually set the alert program without any need for automatic detection of a child in the rear seat. User setting of the alert program using the user input device can prevent any false detection of a child in the rear seat. Further, the user input device is exposed only once the rear door is in an open condition. An actuatable element such as a button or switch may be provided at the shut face panel of the rear door and/or door frame (e.g., on the C-pillar), which conceals the button or switch of the user input device when the rear door is in the closed position. This can prevent unintended setting of the alert program, for example, by the child located within the vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of providing a vehicle rear seat reminder using a vehicle rear seat reminder system, the method comprising:

exposing a user input device of the vehicle rear seat reminder system by opening a door of a vehicle, wherein the user input device is accessible to a user with the door in an open condition, the user input device being inaccessible to the user with the door in a closed condition; and actuating the user input device with the door in the open condition thereby initiating an alert program through user actuation of the user input device;

wherein the alert program is inactive until user actuation of the user input device;

wherein the user input device is on a shut face panel of the door located between an interior panel and an exterior panel of the door that carries a door latch assembly.

2. The method of claim 1 providing a signal to a controller upon actuating the user input device, the controller initiating the alert program in response to the signal.

3. The method of claim 2 comprising the controller receiving engine information from an engine sensor for determining an engine OFF event.

4. The method of claim 3 comprising detecting an engine OFF event using the controller based on the engine information.

5. The method of claim 4 comprising providing a signal to the controller using a door sensor when a driver door is closed after the engine OFF event and the controller initiating a time delay sequence of a preselected period of time in response to the signal from the door sensor.

6. The method of claim 5, wherein the door is a rear door of the vehicle, the method comprising providing an alert if the rear door remains in the closed condition for the preselected period of time using an alarm component.

7. The method of claim 1, further comprising concealing the user input device of the vehicle rear seat reminder system by closing the door of the vehicle.

8. The method of claim 1, wherein the door is a rear door of the vehicle.

9. The method of claim 1, wherein the user input device is connected to the door at a shut face panel of the door.

10. A method of providing a vehicle rear seat reminder system for a vehicle, the method comprising:

providing a user input device at a location on the vehicle such that the user input device is concealed with a rear door of the vehicle in a closed condition and is exposed with the rear door of the vehicle in an open condition; and providing a signal to a controller of the vehicle to initiate an alert program when the user input device is actuated by a user with the rear door in the open condition;

wherein the alert program is inactive until user actuation of the user input device;

wherein the user input device is on a shut face panel of the door located between an interior panel and an exterior panel of the door that carries a door latch assembly.

11. The method of claim 10, wherein, with the rear door in the closed condition, the user input device located between a shut face panel of the rear door and a body component of the vehicle.

12. The method of claim 11, wherein the body component is part of a door frame.

13. The method of claim 12, wherein the user input device is connected to the door frame.

14. The method of claim 11, wherein the user input device is connected to the rear door at the shut face panel of the rear door.

15. In a vehicle, a vehicle rear seat reminder system comprising:

a controller;

an engine sensor connected to the controller to provide engine information to the controller for detecting an engine OFF event;

a front door sensor connected to the controller to provide a signal to the controller upon a front door close event; and a user input device connected to the controller to provide a signal to the controller upon user actuation of the user input device to initiate an alert program, the user input device being concealed between a rear door of the vehicle and a body component of the vehicle with the rear door in a closed condition;

wherein the user input device is on a shut face panel of the door located between an interior panel and an exterior panel of the door that carries a door latch assembly, wherein the alert program is inactive until user actuation of the user input device.

16. The system of claim 15, wherein the user input device is exposed with the rear door of the vehicle in an open condition.

17. The system of claim 15, wherein the user input device is connected to a shut face panel of the rear door.

18. The system of claim 15, wherein the user input device is connected to the body component.

19. The system of claim 15 further comprising an alarm component operably connected to the controller for providing an alert when alert conditions are met.

20. The system of claim 19, wherein the controller includes logic that initiates the alert program upon the controller receiving a signal from the user input device upon user actuation of the user input device with the rear door in the open condition;

detects an engine OFF event using the engine sensor;

detects a front door close event using the front door sensor;

initiates a time delay sequence for a preselected period of time in response to the front door close event; and provides an alert using the alarm component if a rear door open event is not detected within the preselected period of time using a rear door sensor.

* * * * *